Figure 2:
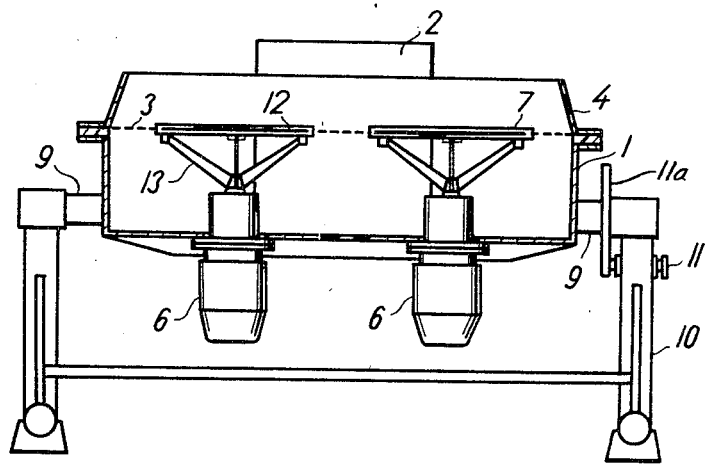

United States Patent

[11] 3,633,744

[72] Inventors Ladislav Kristek;
Antonin Svizela; Ivo Hampl, all of Prerov, Czechoslovakia
[21] Appl. No. 802,566
[22] Filed Feb. 26, 1969
[45] Patented Jan. 11, 1972
[73] Assignee Prerovske Strojirny, narodni potnik
Prerov, Czechoslovakia
[32] Priority Feb. 28, 1968
[33] Czechoslovakia
[31] 1447-68

[54] ARRANGEMENT FOR CLASSIFYING OF LIQUID SUSPENSIONS
4 Claims, 2 Drawing Figs.
[52] U.S. Cl. ................................................ 209/262,
209/269, 209/310, 209/346, 209/368
[51] Int. Cl. ............................................... B07b 1/28
[50] Field of Search .......................................... 209/251,
260, 269, 310, 357, 368, 2, 250, 262, 346; 210/20, 453

[56] References Cited
UNITED STATES PATENTS
| | | | |
|---|---|---|---|
| 2,570,035 | 10/1951 | Laughlin | 209/269 X |
| 3,073,079 | 1/1963 | Balz | 209/260 X |
| 3,325,007 | 6/1967 | Erlenstadt et al. | 209/368 X |
| 3,507,387 | 4/1970 | Alldred et al. | 209/2 |
| 634,929 | 10/1899 | White | 209/357 |

Primary Examiner—Frank W. Lutter
Assistant Examiner—William Cuchlinski, Jr.
Attorneys—Richard Low and Murray Schaffer ABSTRACT: Liquid suspensions are classified by means of a substantially horizontal vibrating screen, whereby the suspension is supplied to the bottom part of the screen. The screened material passes through the screen, taken along by the raising stream of the suspension and is removed from the top part of the screen. The part of material which cannot pass the screen remains in the bottom part, wherefrom it is drained. The screening effect is thus not reduced by solid material settling on the screen surface.

PATENTED JAN 11 1972 3,633,744

INVENTORS.
Ladislav Křístek
Antonín Svížela
Ivo Hampl

ARRANGEMENT FOR CLASSIFYING OF LIQUID SUSPENSIONS

This invention relates to vibrating screens for classifying liquid suspensions, as for instance ceramic slip or different chemical material.

Vibrating screens of different design are actually for this purpose, most of which are vibrating along a circular track in the plane of the screen, or in planes perpendicular or inclined to said plane. The gravitation effect is used for the passage of the classified material through the screen. A drawback of similar screens is their decreasing efficiency and output of the screen surface due to increased collecting of material which did not pass through the screen on the screen surface, requiring a frequent interruption of the operation in order to clean the screen surface with the danger of damaging the fine screen mesh when using mechanical means for this cleaning.

It is an object of this invention to provide a vibrating screen for classifying of liquid suspensions, where the remaining material, which cannot pass the screen, would not settle on the screen surface.

Another object of this invention is to increase the efficiency of classifying.

Still another object of this invention is to eliminate the difficult cleaning of actually used screen surfaces.

Bearing these and other objects of this invention in mind we provide a substantially horizontal vibrating screen, where the liquid suspension to be classified is supplied to the bottom surface of the screen, the screened material being taken along by the raising stream, passing through the screen, the residual material remaining below the screen. The corresponding arrangement comprises a vessel with a substantially horizontal screen on the top, with an inlet for the supply of the liquid suspension to be classified to said vessel below the screen surface; the liquid flowing through the vessel as a result of the pressure differential created above and below the screen, causing passage of part of the screened material through the screen.

Figure 1:
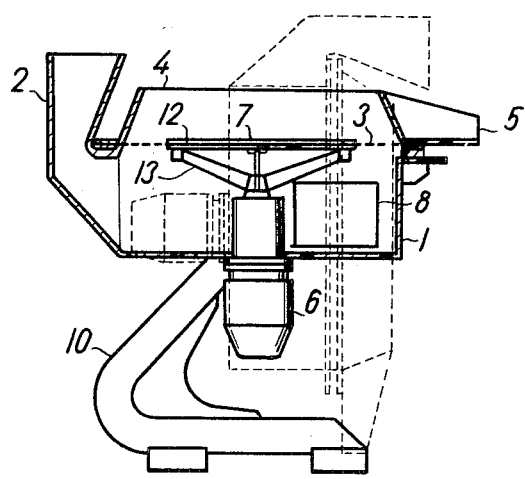

An exemplary embodiment of the object of this invention is schematically shown in the accompanying drawing, where FIG. 1 is a sectional elevation of an arrangement for classifying according to this invention, FIG. 2 a sectional elevation with the plane of section perpendicular to that of FIG. 1.

With reference to FIG. 1, the screening vessel 1, resting on a frame 10, is provided with a supply funnel 2 terminating laterally into vessel 1 and extending above the top of the vessel 1. A horizontal screen 3 is fixed to the top of the vessel 1 by means of a frame 4 with an extension on the top and with a discharge branch 5 at the side opposite to the supply funnel 2. A generator 6 of vibrations of commonly known design is fixed in the lower part of the vessel 1, which transmits by way of the exciter 7 of vibrations the vibrations to the screen 3. The exciter 7 can be advantageously arranged as described our copending application Ser. No. 802,567, filed on even date herewith consisting of an auxiliary frame 12 engaging and encompassing part of the area of the screen, connected with the generator 6 of vibrations by means of a yoke 13. The auxiliary frame 12 either only rests against the screen 3 or the screen 3 is clamped firmly between two corresponding auxiliary frames 12. A removable cover 8 is arranged in the front wall of the vessel 1. Bolts 9 are fixed to both opposite lateral walls of the vessel 1, said bolts 9 supported pivotably in the frame 10. The right bolt 9 is provided with stop means 11 and a disk 11a fixed to the bolt 9. The stop means 11 is mounted on the leg 10 and is adapted to selectively engage the disk 11a at different points so as to enable the vessel 1 to be adjustably fixed either in its horizontal, inclined or vertical position as seen in FIG. 1 in full in dotted lines. The horizontal position serves for the proper screening operation, the inclined and also one vertical position serves for emptying of the water prior to removal of the material which remained in the vessel 1. The vertical position of the vessel 1 is indicated in FIG. 1 by broken lines. A vertical position opposite to that shown in FIG. 1 can serve for emptying of the content of the vessel 1.

The material to be classified is supplied from the top into the supply funnel 2 enters through the lateral wall into the vessel 1 and as the surface of the material in the funnel 2 is maintained higher than the screen 3, a pressurized stream is generated which passes from below through the screen 3, taking along the material, which can pass through the mesh of the screen. The screened material forms above the screen 3 a level about 2 inches of height and is subsequently discharged through the discharge branch 5 into a container not shown. The rest which cannot pass through the screen 3 settles at the bottom of the vessel 1 and does not collect on the screen 3 and therefore also cannot reduce the efficiency of screening. This settled residue is periodically removed from the vessel 1. That can be done either after stoppage of the supply of the material to be screened into the funnel 2 and after release of the stop means 11 by first inclining the vessel 1 into an inclined or vertical position, whereby the water contained in the vessel 1 is allowed to be drained via the screen 3. The material settled in the vessel is thereafter discharged by turning the vessel 1 into a vertical position opposite to that shown in FIG. 1 whereby the settled material passes through the funnel 2 into a not shown container. Another possibility is the discharge through the removed cover 8.

By application of this invention higher specific outputs of the screen surface and reduction of time required for emptying of different dressing devices as mills or floating devices is achieved and thus also a higher grade of economical efficiency of the technological arrangement.

We claim:

1. Apparatus for separating particles from a liquid suspension comprising a vessel having a bottom and sidewalls, an inlet located near its bottom and an outlet located near its top, a screen, said screen conforming to and fixed continuously about its entire periphery around the walls of said vessel between said inlet and outlet opening, said screen dividing said vessel into an upper and lower compartment having fluid communication therebetween only through said screen, said screen, creating a barrier to the flow of said suspension between said lower and upper compartment means for delivering said fluid suspension to said inlet opening and for causing said suspension to flow in a rising current under pressure through said vessel, and means attached to said screen for directly vibrating said screen whereby particles smaller than said screen are caused to be carried by said flow to said outlet and particles larger than said screen are caused to fall to the bottom of said vessel.

2. Apparatus according to claim 1 including port means for removing the accumulated particles from said lower compartment.

3. The apparatus according to claim 1 wherein said means for feeding said fluid suspension comprises an L-shaped funnel opening above said screen and having a horizontal portion communicating with said inlet below said screen.

4. Wherein the apparatus according to claim 1 wherein said vessel is pivotally mounted on a supporting frame and is provided with means for adjustably tilting said vessel.

* * * * *